(12) United States Patent
Asada et al.

(10) Patent No.: US 9,903,441 B2
(45) Date of Patent: Feb. 27, 2018

(54) CHAIN COMPONENT AND CHAIN

(71) Applicant: Tsubakimoto Chain Co., Osaka-shi, Osaka (JP)

(72) Inventors: Misa Asada, Osaka (JP); Takashi Kawata, Osaka (JP); Tomoaki Nakayasu, Osaka (JP); Kota Yoshimoto, Osaka (JP); Nobuhiro Uchida, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 0 days.

(21) Appl. No.: 15/244,121

(22) Filed: Aug. 23, 2016

(65) Prior Publication Data
US 2017/0058997 A1    Mar. 2, 2017

(30) Foreign Application Priority Data

Aug. 28, 2015  (JP) ................................. 2015-169470
Jul. 14, 2016  (JP) ................................. 2016-139646

(51) Int. Cl.

| F16G 13/02 | (2006.01) |
|---|---|
| B32B 15/04 | (2006.01) |
| B32B 9/00 | (2006.01) |
| F16G 13/04 | (2006.01) |
| F16G 13/06 | (2006.01) |
| C23C 8/00 | (2006.01) |
| F16G 13/08 | (2006.01) |
| C23C 12/02 | (2006.01) |

(52) U.S. Cl.
CPC ............... *F16G 13/04* (2013.01); *C23C 8/00* (2013.01); *C23C 12/02* (2013.01); *F16G 13/06* (2013.01); *F16G 13/08* (2013.01)

(58) Field of Classification Search
CPC ..... C23C 14/0641; F16J 9/26; H01M 8/0215; H01M 8/0228; Y10T 428/12611
USPC .................................. 474/206; 428/457, 472
See application file for complete search history.

(56) References Cited

U.S. PATENT DOCUMENTS

| 5,122,247 A * | 6/1992 | Kokado ............... G03G 5/0525 |
| | | 204/484 |
| 5,443,662 A * | 8/1995 | Arai ....................... C23C 16/442 |
| | | 148/209 |
| 5,792,282 A * | 8/1998 | Tahara ...................... C23C 8/34 |
| | | 148/206 |
| 6,042,929 A * | 3/2000 | Burke ................... C23C 14/022 |
| | | 428/141 |

(Continued)

*Primary Examiner* — Henry Y Liu
(74) *Attorney, Agent, or Firm* — Westerman, Hattori, Daniels & Adrian, LLP

(57) ABSTRACT

A chain component which has a simple surface treatment structure and in which satisfactory wear resistance is maintained for a long term; and a chain which employs this chain component so that a satisfactory wear elongation resistance is maintained are provided. A roller chain serving as an industrial chain for power transmission is constructed such that a pair of outer plates linked by two pins and a pair of inner plates linked together by two bushes onto each of which a roller is fit are alternately linked together in a plurality in a state that each pin is loosely fit in each bush. A chromium nitride layer is formed on the outer side of the steel-based substrate of the pin. The chromium nitride layer contains iron at a content higher than 0 mass % and lower than or equal to 55 mass %.

20 Claims, 8 Drawing Sheets

(56) References Cited

U.S. PATENT DOCUMENTS

| | | | | |
|---|---|---|---|---|
| 6,090,223 A * | 7/2000 | Kiuchi | C23C 8/02 | 148/214 |
| 6,328,818 B1 * | 12/2001 | Miyagi | C23C 10/24 | 148/209 |
| 6,989,213 B2 * | 1/2006 | Kaiser | H01M 8/0206 | 428/627 |
| 7,191,558 B1 * | 3/2007 | Conroy | F42B 5/24 | 42/76.01 |
| 7,294,077 B2 * | 11/2007 | Wang | F16G 5/16 | 156/137 |
| 7,399,538 B2 * | 7/2008 | Hoetger | F16C 33/12 | 428/472 |
| 7,650,710 B1 * | 1/2010 | Conroy | F41A 21/22 | 148/207 |
| 7,662,207 B2 * | 2/2010 | Miura | B22F 1/0044 | 75/232 |
| 7,669,358 B1 * | 3/2010 | Conroy | F41A 21/22 | 42/76.01 |
| 7,829,194 B2 * | 11/2010 | Brady | C22C 38/24 | 427/126.1 |
| 7,846,272 B2 * | 12/2010 | Michler | C22C 38/02 | 148/210 |
| 7,891,669 B2 * | 2/2011 | Araujo | C23C 14/0036 | 204/192.15 |
| 7,909,943 B2 * | 3/2011 | Baudis | C23C 8/46 | 148/227 |
| 8,083,866 B2 * | 12/2011 | Baudis | C21D 1/46 | 148/242 |
| 8,920,762 B2 * | 12/2014 | Hashimoto | C01B 21/0615 | 423/409 |
| 9,068,271 B2 * | 6/2015 | Wang | C25D 11/02 | |
| 2002/0104588 A1 * | 8/2002 | Oglesby | C23C 8/80 | 148/220 |
| 2004/0038108 A1 * | 2/2004 | Kaiser | H01M 8/0206 | 429/518 |
| 2004/0042926 A1 * | 3/2004 | Shimizu | C22C 38/04 | 420/38 |
| 2004/0091750 A1 * | 5/2004 | Oliver | B05D 5/086 | 428/698 |
| 2005/0187056 A1 * | 8/2005 | Wang | F16G 5/16 | 474/242 |
| 2006/0099434 A1 * | 5/2006 | Hoetger | F16C 33/12 | 428/472 |
| 2006/0269790 A1 * | 11/2006 | Sarabanda | C23C 14/025 | 428/698 |
| 2007/0099012 A1 * | 5/2007 | Brady | C22C 38/24 | 428/457 |
| 2008/0136116 A1 * | 6/2008 | Sarabanda | C23C 14/025 | 277/443 |
| 2008/0307767 A1 * | 12/2008 | Ragnitz | F16G 13/06 | 59/4 |
| 2009/0278320 A1 * | 11/2009 | Araujo | C23C 14/0036 | 277/442 |
| 2009/0286642 A1 * | 11/2009 | Takagishi | F16G 13/06 | 474/231 |
| 2011/0287883 A1 * | 11/2011 | Ritz | F16G 13/08 | 474/213 |
| 2012/0065010 A1 * | 3/2012 | Tokita | F16G 13/04 | 474/140 |
| 2012/0325673 A1 * | 12/2012 | Wang | C25D 11/02 | 205/320 |
| 2014/0076715 A1 * | 3/2014 | Gorokhovsky | H01J 37/32357 | 204/192.12 |
| 2014/0076716 A1 * | 3/2014 | Gorokhovsky | H01J 37/32357 | 204/192.12 |
| 2014/0076718 A1 * | 3/2014 | Gorokhovsky | H01J 37/32917 | 204/192.38 |
| 2014/0102234 A1 * | 4/2014 | Eitzinger | F16H 55/06 | 74/421 R |
| 2014/0109709 A1 * | 4/2014 | Eitzinger | F16H 55/06 | 74/421 R |
| 2014/0171924 A1 * | 6/2014 | Janssen | C23C 14/0015 | 606/1 |
| 2015/0054222 A1 * | 2/2015 | Herbst-Dederichs | C23C 8/80 | 277/443 |
| 2015/0211603 A1 * | 7/2015 | Koschig | F16G 13/04 | 474/229 |
| 2015/0240347 A1 * | 8/2015 | Lehnert | C23C 14/06 | 428/140 |
| 2015/0275120 A1 * | 10/2015 | Lehnert | C23C 28/322 | 508/129 |
| 2016/0074930 A1 * | 3/2016 | Inoue | C23C 8/28 | 72/462 |
| 2016/0153525 A1 * | 6/2016 | Eda | C22C 38/12 | 474/228 |
| 2016/0305545 A1 * | 10/2016 | Okazaki | F16J 9/14 | |

* cited by examiner

CHAIN COMPONENT AND CHAIN

CROSS-REFERENCE TO RELATED APPLICATIONS

This non-provisional application claims priority under 35 U.S.C. § 119(a) on patent application No. 2015-169470 filed in Japan on Aug. 28, 2015 and patent application No. 2016-139646 filed in Japan on Jul. 14, 2016, the entire contents of which are hereby incorporated by reference.

FIELD

The present disclosure relates to: a chain component such as a pin, a bush, a link plate, and a roller serving as a constituent component of an industrial chain for power transmission such as a roller chain and a silent chain employed, for example, as a timing chain of an automobile or the like; and a chain provided with this chain component.

BACKGROUND

A technique is known that when a chromium nitride film is formed on a metal surface, the wear resistance and the corrosion resistance of the metal is improved. Thus, for the purpose of lifetime enhancement of a mechanical member, a mold tool, a machining tool, or the like, this chromium nitride film formation is widely employed.

In general, the chromium nitride film is formed by a physical vapor deposition (PVD) method such as: an ion plating method that in a vacuum chamber, Cr is vaporized, ionized, and then projected onto a substrate and, at the same time, nitrogen gas is introduced so that the chromium nitride film is formed; and a sputtering method that a high voltage is applied between a target and a substrate so that glow discharge is generated and Ar ions of the obtained plasma are caused to collide with the target surface and thereby Cr atoms are sputtered and deposited onto the substrate.

However, when such a chromium nitride film formed by the PVD method is employed as a surface treatment layer of a high-load slide member such as a chain, the chromium nitride film easily spalls from the metal substrate of steel or the like and hence there has been a problem of difficulty in causing the chromium nitride film to adhere to the surface of the substrate and thereby to unite with the substrate such that spalling hardly occurs.

Then, in the PVD method, in some cases, droplets occur on the surface. The droplets cause a problem that the surface roughness increases and cracks occur with starting from the droplets so that the wear resistance is degraded. Even when the droplets are removed by polishing, holes are formed in the portions where the droplets are removed. Then, the holes grow larger in association with the load and then the holes are connected together so that a problem is caused that the wear resistance is not allowed to be improved.

Further, the PVD method has a problem that lifetime enhancement by increasing the film thickness is not allowed to be performed because this approach causes occurrence of cracks and hence degradation in the wear resistance.

Further, there has been a problem that if the to-be-processed material has a hole, film formation up to the inner face of the hole is difficult.

Examples of the above-described mechanical member include a pin provided in a timing chain for automobile engine. Examples of such a timing chain include a roller chain, a bushed chain, and a silent chain.

A roller chain is constructed such that both end parts of a cylinder-shaped bush in a state that a roller is fit onto the bush are press-fit into the bush holes of a pair of inner plates and then both end parts of the pin having been fit in the bush are press-fit into the pin holes of a pair of outer plates arranged individually on both outer sides of the pair of inner plates. A bushed chain is not provided with such a roller.

In a timing chain of the conventional art, for the purpose of wear resistance improvement of the bush and the pin, chromizing has been applied on the steel base material of the pin.

However, the timing chain had a problem that when used in the engine room of an automobile together with engine oil having severely been degraded, the pin and the bush may easily be worn out so that the lifetime may become short.

Further, in a case that soot generated in the combustion process of the engine gets mixed into the engine oil, since the soot is hard, when the lubricating oil containing the soot enters a space between the pin and the bush serving as the component parts of a timing chain running at a high speed and a high load, wear of the pin and the bush may be accelerated in spite of the formation of the coating film between the pin and the bush.

Thus, surface treatment has been required that improves further the wear resistance of the chain.

For the purpose of resolving a problem that, when a chromium nitride film is formed on a metal surface, heat-cycle spalling easily occurs and hence the adhesion property with the substrate is unsatisfactory, Japanese Patent Application Laid-Open Publication No. H11-29848 discloses a method that: Cr plating is performed on the surface of a metallic material; then the metallic material is heated in a halogenated compound or in a reactive gas containing halogen so that the Cr plating surface is cleaned and activated; and then the metallic material is heated in a nitriding atmosphere so that the Cr plating surface is nitrided and thereby a chromium nitride film is formed.

SUMMARY

In the formation method for a chromium nitride film of Japanese Patent Application Laid-Open Publication No. H11-29848, special Cr plating such as industrial-use Cr plating, high-corrosion-resistance Cr plating without cracks, macro-porous Cr plating, and amorphous Cr plating containing 2% to 4% of carbon is performed on a substrate of steel or the like, then halogen pretreatment is performed, and then nitriding treatment is performed. Thus, this process is extremely complicated. Further, as described in Examples 1 to 3 of Japanese Patent Application Laid-Open Publication No. H11-29848, the Vickers hardness of the obtained chromium nitride film is 1700 to 2000 HV and hence there is a large difference in the hardness between the chromium nitride film and a soft base material. Thus, a sufficient adhesion property may be not obtained and hence the wear resistance may be not maintained for a long term.

Thus, when the surface treatment method of Japanese Patent Application Laid-Open Publication No. H11-29848 is applied on a chain component such as the pin of a timing chain, problems are expected to arise that the fabrication process is complicated, the fabrication cost is high, and a satisfactory wear resistance is not maintained for a long term.

The present disclosure has been devised in view of this situation. An object thereof is to provide: a chain component which has a simple surface treatment structure and in which satisfactory wear resistance is maintained for a long term;

and a chain which employs this chain component so that a satisfactory wear elongation resistance is maintained.

A chain component of an industrial chain for power transmission according to a first aspect of the present disclosure comprises: a steel-based substrate; and a chromium nitride layer formed on an outer side of the steel-based substrate and containing iron at a content higher than 0 mass % and lower than or equal to 55 mass %.

In a chain according to a second aspect of the present disclosure, constructed such that a pair of outer plates linked together by two pins and a pair of inner plates linked together by two bushes are alternately linked together in a plurality in a state that each pin is loosely fit in each bush, at least any one of the pin, the bush, the inner plate, and the outer plate is a chain component according to the first aspect.

In a chain according to a third aspect of the present disclosure, constructed such that a pair of outer plates linked together by two pins and a pair of inner plates linked together by two bushes onto each of which a roller is fit are alternately linked together in a plurality in a state that each pin is loosely fit in each bush, at least any one of the pin, the bush, the inner plate, the outer plate, and the roller is a chain component according to the first aspect.

In a chain according to a fourth aspect of the present disclosure, constructed such that a plurality of inner plates whose one end part in a shorter-side direction is provided with a pair of linkage teeth formed in a W-shape are linked together in a width direction of the chain by pins in a state that one linkage tooth of one inner plate of adjacent inner plates overlaps with the other linkage teeth of the other inner plate and such that an outer plate is arranged on each outer side of the width direction, at least any one of the pin, the inner plate, and the outer plate is a chain component according to the first aspect.

According to the chain component of the present disclosure, the chromium nitride layer is formed on the outer side of a steel-based substrate and hence the surface treatment structure is simple. Thus, fabrication is achieved in a small number of process steps and hence easily and inexpensively.

Chromium nitride has a low friction coefficient and hence the chain component on which the chromium nitride layer is formed has a low aggressiveness to an engaging member. Further, sliding heat is reduced in the chromium nitride layer. Furthermore, chromium nitride has a high oxidation starting temperature and hence is hardly oxidized even at high temperatures so that the wear resistance of the chain component is maintained satisfactorily.

The chromium nitride layer contains iron and hence has a satisfactory adhesion property with the steel-based substrate. In addition, since the iron content is higher than 0 mass % and lower than or equal to 55 mass %, the wear resistance of the chain component is maintained for a long term.

The chain of the present disclosure has a satisfactory wear elongation resistance.

The above and further objects and features will more fully be apparent from the following detailed description with accompanying drawings.

DETAILED DESCRIPTION

Figure 1:
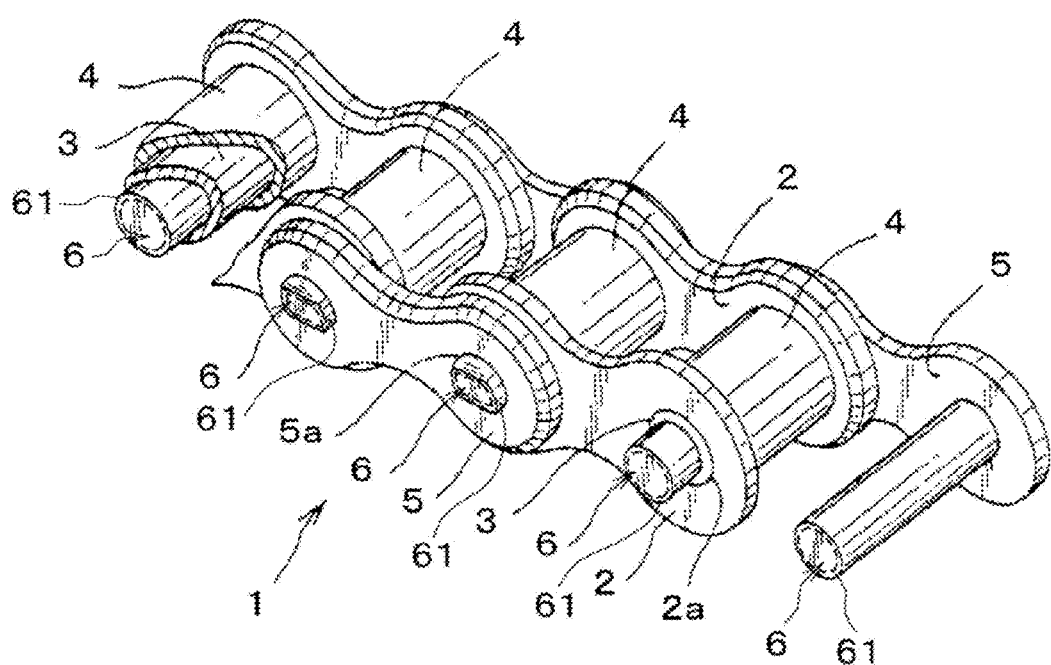
FIG. 1 is a perspective one-part view illustrating an example of a roller chain.

The chain component according to the present disclosure includes: a steel-based substrate; and a chromium nitride layer formed on the outer side of the steel-based substrate.

The chromium nitride layer contains Fe at a content higher than 0 mass % and lower than or equal to 55 mass %. The lower limit of the Fe content is preferably 1 mass %, more preferably 5 mass %, and still more preferably 8 mass %. The upper limit is preferably 45 mass % and more preferably 32 mass %.

It is preferable that the Fe has a concentration distribution gradually decreasing outward from the surface of the steel-based substrate.

It is preferable that the Cr and the N content gradually decreases from the outer side toward the surface side of the steel-based substrate.

In the chromium nitride layer, within the entire contents of 100 mass %, it is preferable that Fe is contained at a content higher than 0 mass % and lower than or equal to 55 mass %, Cr is contained at a content of 45 mass % or higher and 90 mass % or lower, and N is contained at a content of 5 mass % or higher and 25 mass % or lower.

The lower limit of the Fe content is preferably 1 mass %, more preferably 5 mass %, and still more preferably 8 mass %. The upper limit is preferably 45 mass % and more preferably 32 mass %.

The lower limit of the Cr content is preferably 48 mass %/o and more preferably 51 mass %. The upper limit is preferably 77 mass % and more preferably 67 mass %.

The lower limit of the N content is preferably 9 mass % and more preferably 13 mass %.

Here, the Fe content indicates a value obtained by qualitative/quantitative analysis using an EPMA. Further, the Cr and the N content indicate values each obtained such that a value obtained by qualitative/quantitative analysis using the EPMA is corrected with taking into consideration an analysis value of a standard sample of chromium nitride.

It is preferable that the chromium nitride layer has a thickness of 2 μm or greater and 30 μm or smaller. In this case, the surface roughness is small and hence cracks hardly occur and a satisfactory wear resistance is obtained. Further, the chain obtained by assembling the chain components has a satisfactory wear elongation resistance.

An intermediate layer may be provided between the chromium nitride layer and the steel-based substrate.

The intermediate layer may be composed of Cr, CrB, $CrB_2$, CrC, $Cr_2N$, $Cr_2O_3$, $CrSi_2$, CrNi, CrB—O, $CrB_2$—O, (V,Cr)C, (Cr,Zr)N, CrBN, $CrB_2$+Ni, (Cr,Mn)C, (Cr,Mo)N, (V,Cr)B, (Cr,Fe)C, (Cr,W)N, (Cr,Mn)B, (Cr,Co)C, (Cr,Cu)N, (Cr,Fe)B, (Cr,Ni)C, (Cr,V)N, (Cr,Co)B, (Cr,Cu)C, (Cr,Ni)B, (Cr,Zn)C, (Cr,Cu)B, (Cr,Zr)C, (Cr,Zn)B, (Cr,Nb)C, (Cr,Zr)B, (Cr,Mo)C, (Cr,Nb)B, (Cr,Hf)C, (Cr,Mo)B, (Cr,Ta)C, (Cr, HDB, (Cr,W)C, (Cr,Ta)B, (Cr,W)B, or the like.

The chromium nitride layer of the chain component according to the present disclosure is formed on the outer side of the steel-based substrate by a method that: a steel-based substrate and a treatment agent containing Cr powder, aluminum oxide (referred to as alumina, hereinafter), and ammonium halide are put in a heating furnace; then the heating furnace is heated to a desired temperature and then held for a given time; and then the heating furnace is slowly cooled down. The treatment agent may contain compounds serving as the origins of the elements contained in the above-described intermediate layer.

The following description is given for a case that the chain component according to the present disclosure is applied to the pin of a roller chain serving as a timing chain of an automobile engine or the like.

FIG. 1 is a perspective one-part view illustrating an example of a roller chain 1.

The roller chain 1 is constructed such that both ends of a bush 3 are respectively press-fit into bush holes 2a and 2a of a pair of inner plates 2 and 2 and then both ends of a pin 6 having been fit in the bush 3 are press-fit into pin holes 5a and 5a of a pair of outer plates 5 and 5 arranged respectively on both outer sides of the pair of inner plates 2 and 2. A roller 4 is fit onto the bush 3.

The chromium nitride layer 61 described above is provided on the outer side of the pin 6.

The fabrication method for chain component according to the present disclosure is described below with adopting the pin 6 as an example.

For example, the employed steel substrate for the pin 6 is a wire rod composed of carbon steel, chromium-molybdenum steel (SCM), high carbon-chromium bearing steel (SUJ), or the like.

Cr diffusion metallizing is performed on the surface of the steel substrate of the pin 6 and then N diffusion metallizing is performed so that a chromium nitride layer 61 is formed on the surface side.

The Cr diffusion metallizing may be performed by a publicly known method referred to as a "powder packing method".

Specifically, first, the pin 6 and a treatment agent containing Cr powder, alumina, and an ammonium halide are charged into an alumina boat or the like and then the alumina boat is put in a heating furnace such as an electric furnace. In the treatment agent, within the entire contents of 100 mass %/o, it is preferable that the Cr powder is contained at a content of 60 to 67 mass %, the alumina is contained at a content of 30 to 37 mass %, and the ammonium halide is contained at a content of 0.2 to 3 mass %.

Employable ammonium halides include ammonium chloride, ammonium bromide, ammonium iodide, and ammonium fluoride. One kind or two or more kinds of such ammonium halides are selected depending on the desired layer configuration.

Replacement with an inert gas such as Ar and $N_2$ is performed before heating.

Then, heating to a given temperature is performed.

At that time, $NH_3$ and/or $N_2$ may be flowed at a given flow rate depending on the thickness of the desired chromium nitride layer 61, the layer configuration, the overall layer thickness, or the like.

The material is held for a given time and then cooled down.

In a case that a desired layer has not been obtained, again, in a state that $NH_3$ and/or $N_2$ is flowed, the material is heated to a given temperature, then held for a given time, and then cooled down.

The composition ratios of the treatment agent, the treatment temperature, and the holding time are determined in accordance with the composition of the steel-based substrate, the desired thickness of the chromium nitride layer 61, the layer configuration, the overall layer thickness, and the like.

Specific examples of the formation method for the chromium nitride layer 61 include a method of nitriding the surface of the steel-based substrate or a CrC layer.

According to this formation method for the chromium nitride layer 61, the chromium nitride layer 61 is allowed to be formed on the outer side of the steel-based substrate in a small number of process steps and hence easily and inexpensively. Then, the Cr, the C, and the Fe have concentration gradients and hence a satisfactory adhesion property between the chromium nitride layer 61 and the steel-based substrate is obtained.

In the chain component obtained by the above-described fabrication method, the chromium nitride layer 61 having a high oxidation starting temperature and hardly oxidized even at high temperatures is formed on the outer side. Thus, a satisfactory wear resistance is obtained and a satisfactory adhesion property of the chromium nitride layer 61 to the steel-based substrate is achieved. Accordingly, a satisfactory wear resistance is maintained for a long term.

Here, the description given above has been made for a case that the chromium nitride layer 61 is formed on the pin 6. However, employable applications are not limited to this. That is, the chromium nitride layer may be formed on the surface of at least one of the chain components consisting of the inner plate 2, the bush 3, the roller 4, and the outer plate 5.

According to chain 1 provided with the chain component according to the present disclosure, a satisfactory wear elongation resistance is maintained for a long term.

The chain according to the present disclosure may be a bushed chain not provided with a roller.

The chain according to the present disclosure may be a silent chain.

Figure 2:
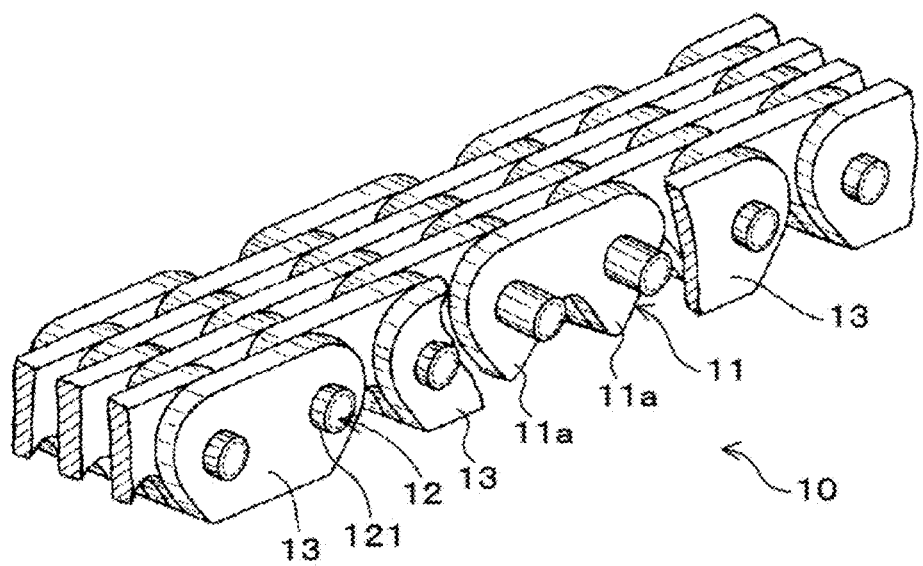
FIG. 2 is a perspective one-part view illustrating an example of a silent chain.

FIG. 2 is a perspective one-part view illustrating an example of a silent chain 10.

The silent chain 10 is constructed such that a plurality of inner plates 11 whose one end part in the shorter-side direction is provided with a pair of linkage teeth 11a and 11a formed in a W-shape are linked together in the width direction of the silent chain 10 by pins 12 in a state that one linkage tooth 11a of one inner plate 11 of adjacent inner plates 11 overlaps with the other linkage tooth 11a of the other inner plate 11 and such that an outer plate 13 is arranged on each outer side of the width direction.

In the silent chain 10, the chromium nitride layer on the surface of at least one of the chain components consisting of the inner plate 11, the pin 12, and the outer plate 13. In FIG. 2, a case that the pin 12 has the chromium nitride layer 121 on an outer side is illustrated.

EXAMPLES

The present disclosure is described below in detail with reference to examples.

Example 1

A wire rod of SUJ2 employed as a to-be-processed material of Example 1 was cut into a given length. Then, grinding was performed on this material so that the pin 6 substrate serving as a steel-based substrate was obtained.

A treatment agent containing Cr powder, alumina, and NH$_4$Cl within the above-described numerical values of composition range and the pin 6 were put in an alumina boat. Then, the alumina boat was put in a heating furnace. Replacement with an inert gas was performed and then addition gases (NH$_3$ and N$_2$) were flowed at suitable flow rates. Then, heating to the above-described temperature was performed and then this temperature was held so that the chromium nitride layer 61 was formed on the outer side of the pin 6. After that, the power supply of the heater was turned OFF so that cooling down was performed.

As such, the pin 6 was obtained in which the chromium nitride layer 61 was formed on the outer side of the steel substrate.

In the chromium nitride layer 61, the Fe content was 13 mass %, the Cr content was 74 mass %, the N content was 13 mass %, and the thickness was 13 μm.

Figure 3:
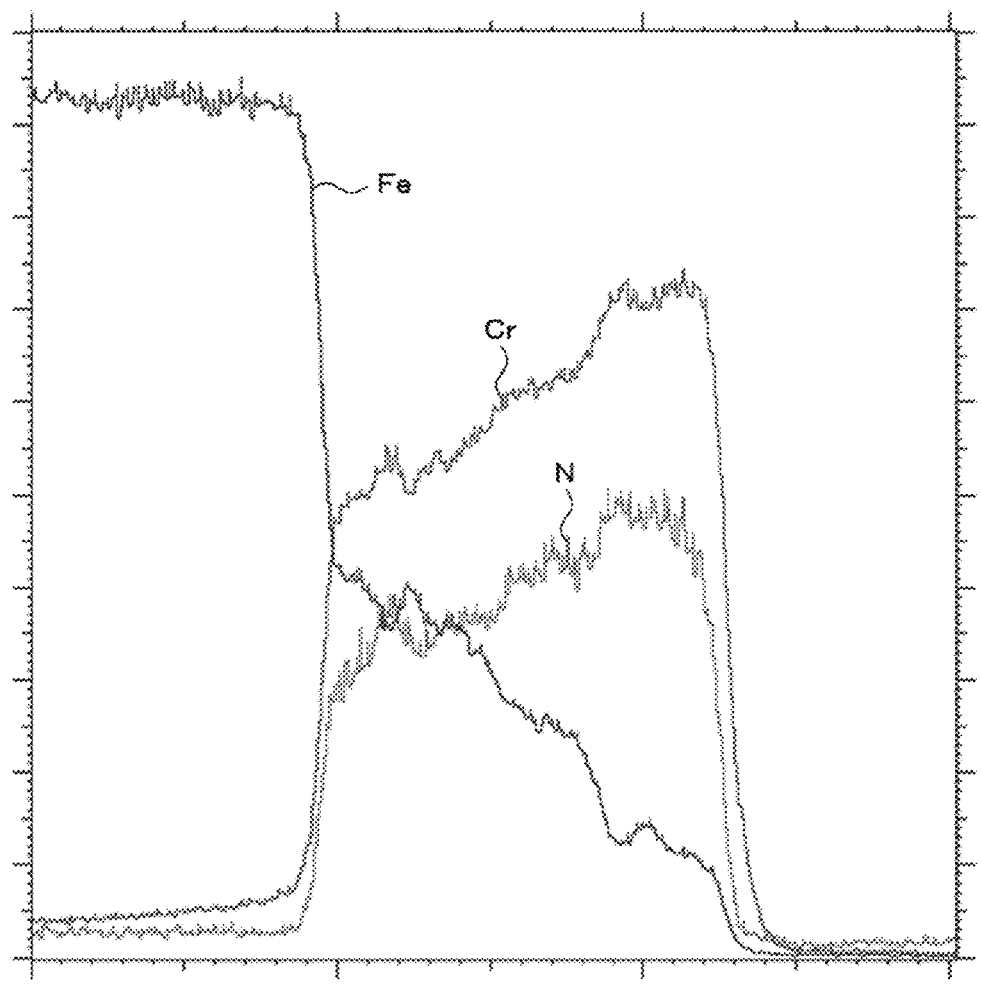
FIG. 3 is a graph illustrating cross-sectional composition distributions of Fe, Cr, and N in a pin of Example 1 obtained by line analysis using an EPMA (Electron Probe MicroAnalyzer).

FIG. 3 is a graph illustrating cross-sectional composition distributions of Cr N, and Fe in the pin 6 of Example 1 obtained by line analysis using the EPMA. The horizontal axis indicates the length in the thickness direction and the vertical axis indicates the detected intensity of each component.

The measurement conditions were as follows.
Acceleration voltage: 15 kV
Sample current: 50 nA
Beam diameter: 1 μm As recognized from FIG. 3, as going from the outer side to the pin 6 substrate surface side, the Fe content gradually increases and the Cr content and the N content gradually decrease.

Thus, it has been confirmed that Cr and N diffusion metallizing was achieved in the surface-side part of the pin 6 substrate so that the chromium nitride layer 61 was formed on the outer side of the steel-based substrate. Since the Cr and the N underwent diffusion metallizing, concentration gradients have been formed. The Fe also had a concentration distribution that the content gradually decreases from the surface-side part of the steel-based substrate toward the outer side. Since the Fe, the Cr, and the N had such concentration gradients, a satisfactory adhesion property between the pin 6 substrate and the chromium nitride layer 61 was concluded.

Comparative Example 1

A pin of Comparative Example 1 in which a CrC layer having a thickness of 15 μm was formed on a steel substrate was obtained by a powder packing method of the conventional art.

Comparative Example 2

A pin of Comparative Example 2 in which a chromium nitride layer having a thickness of 6 μm was formed on a steel substrate was obtained by a PVD method of the conventional art.

Each roller chain was assembled by employing the pins 6 of Example 1, the pins of Comparative Example 1, or the pins of Comparative Example 2 described above.

The wear elongation resistance was evaluated for each roller chain.

First, engine oil of an SAE standard "5W-30" was employed and then engine oil having been degraded in association with actual running of 5000, 10000, or 15000 km in town was collected from an automobile.

Then, severe testing was performed by using each engine oil such that a roller chain provided with the pins of Example 1, Comparative Example 1, or Comparative Example 2 was rotated at a high speed for 100 hours. The results are listed in Table 1. Table 1 lists the data of Example 1 and Comparative Example 2 for the engine oil of each running distance in terms of the ratio (a wear elongation ratio) of the wear elongation rate obtained when the wear elongation rate of the roller chain of Comparative Example 1 is premised to be 100.

TABLE 1

| RUNNING DISTANCE (km) | EXAMPLE 1 | COMPARATIVE EXAMPLE 1 | COMPARATIVE EXAMPLE 2 (%) |
|---|---|---|---|
| 5000 | 80 | 100 | 118 |
| 10000 | 70 | 100 | 146 |
| 15000 | 63 | 100 | 182 |

As recognized from Table 1, the wear elongation resistance was satisfactory in the descending order of Example 1, Comparative Example 1, and Comparative Example 2. That is, it has been recognized that the roller chain 1 of Example 1 in which the chromium nitride layer 61 containing Fe at a content higher than 0 mass % and lower than or equal to 55 mass % was formed on the outer side of the steel-based substrate had a satisfactory wear elongation resistance. Then, when engine oil having the longer running distance (suffering the severer degradation) was used, the improvement effect for the wear elongation resistance of the chromium nitride layer 61 became the higher.

Figure 4:
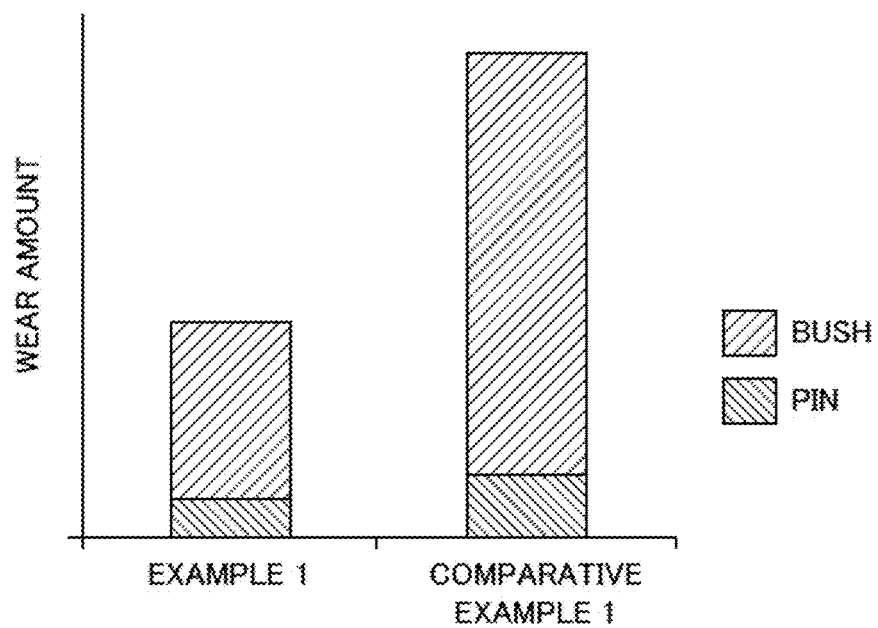
FIG. 4 is a graph illustrating the results of wear amounts of a pin and a bush in which the pin has been fit, obtained by measurement on a roller chain provided with pins of Example 1 and a roller chain provided with pins of Comparative Example 1 after each chain has been operated for a given time.

FIG. 4 is a graph illustrating the results of wear amounts of the pin and the bush in which the pin has been fit, obtained by measurement on the roller chain provided with the pins 6 of Example 1 and the roller chain provided with the pins of Comparative Example 1 after each chain has been operated for a given time.

As recognized from FIG. 4, when the roller chain provided with the pins 6 of Example 1 was employed, the wear amounts of the pin and the bush have decreased in comparison with the case that the roller chain provided with the pins of Comparative Example 1 was employed. In particular, the wear amount of the bush has remarkably decreased. This is because the chromium nitride layer 61 of the pin 6 of Example 1 had a lower aggressiveness to the slide engaging member (the bush).

Figure 5:
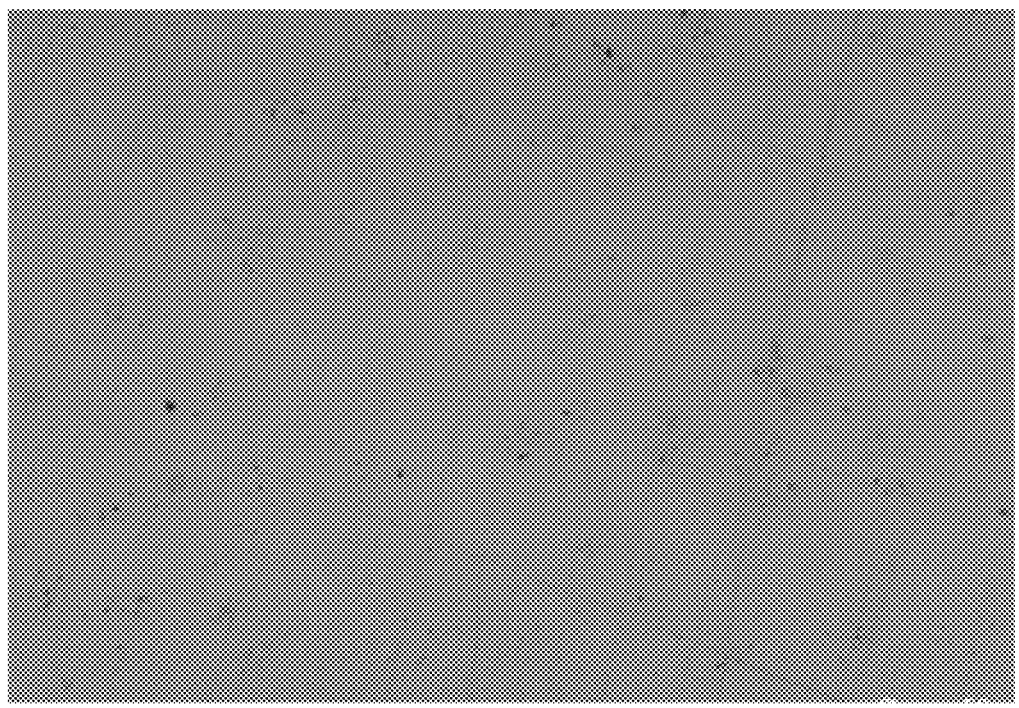
FIG. 5 is an optical micrograph representing the surface of a pin of Example 1.
Figure 6:
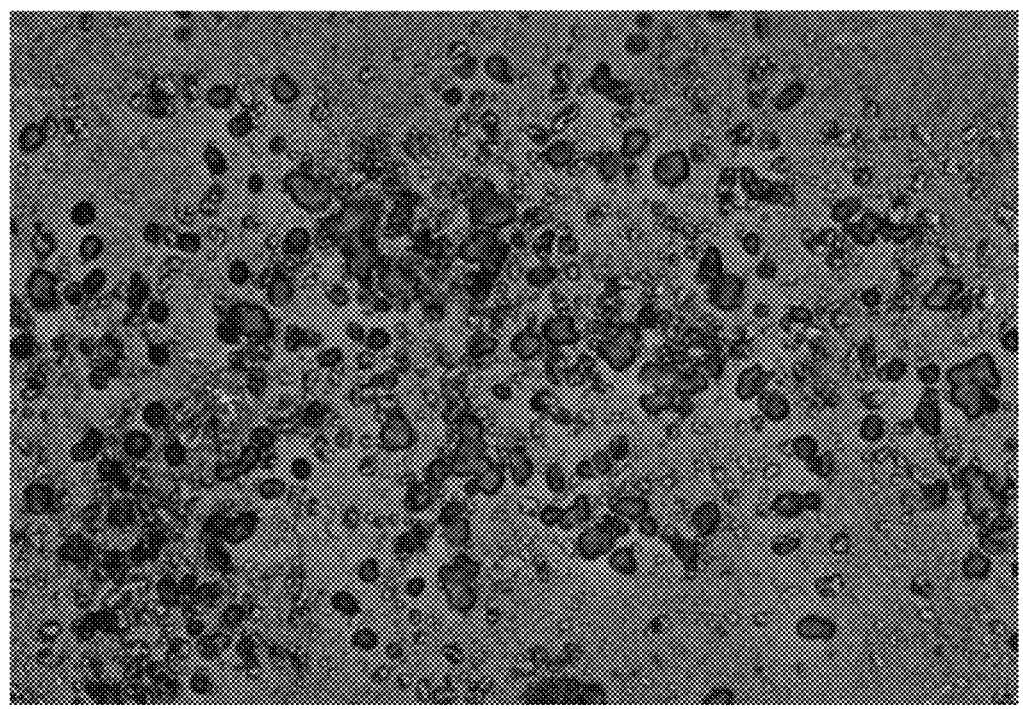
FIG. 6 is an optical micrograph representing the surface of a pin of Comparative Example 2.

FIG. 5 is an optical micrograph representing the surface of the pin 6 of Example 1. FIG. 6 is an optical micrograph representing the surface of the pin of Comparative Example 2.

In the pin 6 of Example 1 in FIG. 5, droplets are absent on the surface. In contrast, in the pin of Comparative Example 2, a large number of droplets have occurred. This indicates that in the pin of Comparative Example 2, the surface roughness has increased, cracks have occurred with starting from the droplets, and the wear resistance has been degraded.

Next, described are results of wear elongation resistance evaluation tests performed such that engine oil having been degraded was used and then the Fe content in the chromium nitride layer 61 of the roller chain was changed.

Similarly to Example 1, the pins 6 of the Examples 2 to 6 and the pin of Comparative Example 3 having element compositions listed in the following Table 2 were fabricated. Table 2 lists also Example 1 and Comparative Example 1 described above. Among the elements in Table 2, the Fe content indicates a value obtained by qualitative/quantitative analysis using the EPMA. Further, the Cr and the N content indicate values each obtained such that a value obtained by qualitative/quantitative analysis using the EPMA is corrected with taking into consideration an analysis value of a standard sample of chromium nitride.

Further, described are results of wear elongation resistance evaluation tests performed such that engine oil having been degraded was used and then the layer thickness of the chromium nitride layer 61 of the roller chain was changed.

Engine oil of an SAE standard "0W-30" was employed and then engine oil having been degraded in association with actual running of 10000 km in town was collected from an automobile.

Then, severe testing was performed by using this engine oil such that a roller chain provided with the pins of each Example in which the thickness of the chromium nitride layer 61 was changed was rotated at a high speed for 180 hours.

Figure 8:
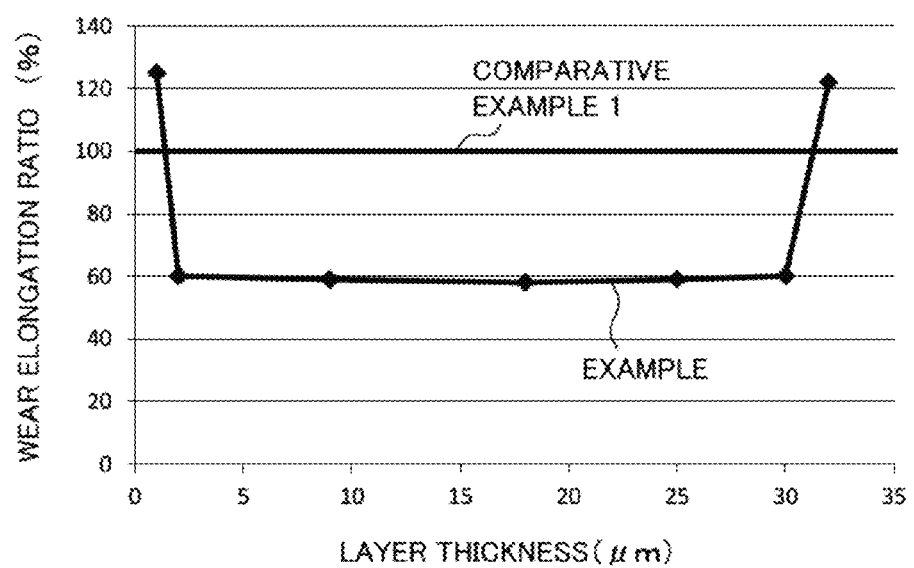
FIG. 8 is a graph illustrating the relation between the layer thickness of the chromium nitride layer and the wear elongation ratio.

FIG. 8 is a graph illustrating the relation between the layer thickness of the chromium nitride layer and the wear elongation ratio. The horizontal axis indicates the thickness (μm) and the vertical axis indicates the ratio (the wear elongation

TABLE 2

| | EXAMPLE 2 | EXAMPLE 3 | EXAMPLE 4 | EXAMPLE 1 | EXAMPLE 5 | EXAMPLE 6 | COMPARATIVE EXAMPLE 1 | COMPARATIVE EXAMPLE 3 (%) |
|---|---|---|---|---|---|---|---|---|
| Cr | 90 | 77 | 67 | 74 | 51 | 45 | | 30 |
| N | 9 | 18 | 25 | 13 | 17 | 5 | | 15 |
| Fe | 1 | 5 | 8 | 13 | 32 | 55 | | 60 |
| TOTAL AMOUNT | 100 | 100 | 100 | 100 | 100 | 105 | | 105 |
| WEAR ELONGATION RATIO | 80 | 67 | 60 | 59 | 60 | 98 | 100 | 122 |

Engine oil of an SAE standard "0W-20" was employed and then engine oil having been degraded in association with actual running of 10000 km in town was collected from an automobile.

Then, severe testing was performed by using this engine oil such that a roller chain provided with the pins of Examples 1 to 6, Comparative Example 1, or Comparative Example 3 was rotated at a high speed for 150 hours. The results are listed in the Table 2. Table 2 lists the data of each Example and Comparative Example 3 in terms of the ratio (the wear elongation ratio) of the wear elongation rate obtained when the wear elongation rate of the roller chain of Comparative Example 1 is premised to be 100.

Figure 7:
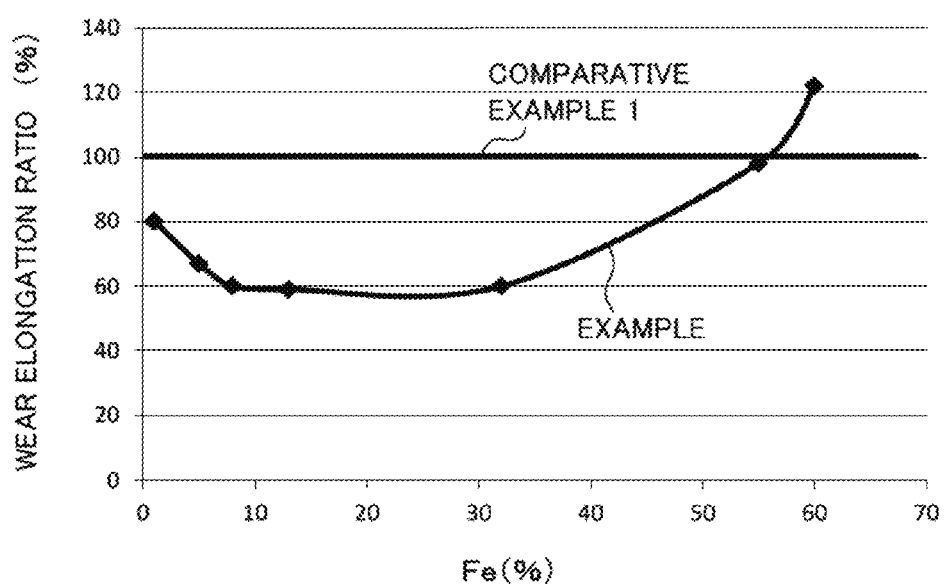
FIG. 7 is a graph illustrating the relation between the Fe content in the chromium nitride layer and the wear elongation ratio.

FIG. 7 is a graph illustrating the relation between the Fe content in the chromium nitride layer and the wear elongation ratio. The horizontal axis indicates the Fe content (mass %) and the vertical axis indicates the wear elongation ratio (%).

As recognized from Table 2 and FIG. 7, the roller chain 1 of each Example in which the chromium nitride layer 61 containing Fe at a content higher than 0 mass % and lower than or equal to 55 mass % was formed had a satisfactory wear elongation resistance.

The lower limit of the Fe content is preferably 1 mass %, more preferably 5 mass %, and still more preferably 8 mass %. The upper limit is preferably 45 mass % and more preferably 32 mass %.

The lower limit of the Cr content is preferably 45 mass % and more preferably 48 mass %, and still more preferably 51 mass %. The upper limit is preferably 90 mass % and more preferably 77 mass %, and still more preferably 67 mass %.

The lower limit of the N content is preferably 5 mass % and more preferably 9 mass %, and still more preferably 13 mass %. The upper limit is preferably 25 mass % ratio: %) of the wear elongation rate obtained when the wear elongation rate of the roller chain of Comparative Example 1 is premised to be 100.

As recognized from FIG. 8, when the thickness of the chromium nitride layer 61 was 2 μm or greater and 30 μm or smaller, a satisfactory wear elongation resistance was obtained. When the thickness has exceeded 30 μm, cracks had occurred and hence the wear elongation resistance was degraded.

As described above, it has been confirmed that: the chromium nitride layer 61 of the pin 6 according to each Example of the present disclosure does not droplets and hence hardly spalls; the chromium nitride layer 61 has a low aggressiveness to the engaging member; the thickness is allowed to be set equal to 2 μm or greater and 30 μm or smaller; and hence the roller chain 1 has a satisfactory wear elongation resistance and the satisfactory wear elongation resistance is maintained for a long term.

As described above, a chain component of an industrial chain for power transmission according to a first aspect of the present disclosure comprises: a steel-based substrate; and a chromium nitride layer formed on an outer side of the steel-based substrate and containing iron at a content higher than 0 mass % and lower than or equal to 55 mass %.

In the aspect, the chromium nitride layer is formed on the outer side of the steel-based substrate and hence the surface treatment structure is simple. Thus, fabrication is achieved in a small number of process steps and hence easily and inexpensively.

Chromium nitride has a low friction coefficient and hence the chain component on which the chromium nitride layer is formed has a low aggressiveness to an engaging member. Further, sliding heat is reduced in the chromium nitride layer. Furthermore, chromium nitride has a high oxidation starting temperature and hence is hardly oxidized even at high temperatures so that the wear resistance of the chain component is maintained satisfactory.

The chromium nitride layer contains iron and hence has a satisfactory adhesion property with the steel-based substrate. In addition, since the iron content is higher than 0 mass % and lower than or equal to 55 mass %, the wear resistance of the chain component is maintained for a long term.

In the chain according to the aspect of the present disclosure, it is preferable that the iron has a concentration distribution gradually decreasing outward from a surface of the steel-based substrate.

In the preferable aspect, a more satisfactory adhesion property with the steel-based substrate is obtained.

In the chain according to the aspect of the present disclosure, it is preferable that the chromium and the nitrogen in the chromium nitride layer have a concentration distribution gradually decreasing from the outer side toward the surface of the steel-based substrate.

In the preferable aspect, a more satisfactory adhesion property with the steel-based substrate is obtained.

In the chain according to the aspect of the present disclosure, it is preferable that within entire contents of 100 mass %, iron is contained at a content higher than 0 mass % and lower than or equal to 55 mass %, chromium is contained at a content of 45 mass % or higher and 90 mass % or lower, and nitrogen is contained at a content of 5 mass % or higher and 25 mass % or lower.

In the preferable aspect, the wear resistance is maintained more satisfactory and a more satisfactory adhesion property with the steel-based substrate is obtained.

In the chain according to the aspect of the present disclosure, it is preferable that the iron content is 1 mass % or higher and 45 mass % or lower.

In the preferable aspect, a more satisfactory wear resistance is obtained.

In the chain according to the aspect of the present disclosure, it is preferable that the chromium nitride layer has a thickness of 2 μm or greater and 30 μm or smaller.

In the preferable aspect, the surface roughness is small and hence cracks hardly occur. Thus, a satisfactory wear resistance is obtained.

In a chain according to a second aspect of the present disclosure, constructed such that a pair of outer plates linked together by two pins and a pair of inner plates linked together by two bushes are alternately linked together in a plurality in a state that each pin is loosely fit in each bush, at least any one of the pin, the bush, the inner plate, and the outer plate is a chain component according to the first aspect.

The bushed chain of the aspect has a satisfactory wear elongation resistance.

In a chain according to a third aspect of the present disclosure, constructed such that a pair of outer plates linked together by two pins and a pair of inner plates linked together by two bushes onto each of which a roller is fit are alternately linked together in a plurality in a state that each pin is loosely fit in each bush, at least any one of the pin, the bush, the inner plate, the outer plate, and the roller is a chain component according to the first aspect.

The roller chain of the aspect has a satisfactory wear elongation resistance.

In a chain according to a fourth aspect of the present disclosure, constructed such that a plurality of inner plates whose one end part in a shorter-side direction is provided with a pair of linkage teeth formed in a W-shape are linked together in a width direction of the chain by pins in a state that one linkage tooth of one inner plate of adjacent inner plates overlaps with the other linkage teeth of the other inner plate and such that an outer plate is arranged on each outer side of the width direction, at least any one of the pin, the inner plate, and the outer plate is a chain component according to the aspect.

The silent chain of the aspect has a satisfactory wear elongation resistance.

The embodiment disclosed herein is to be recognized as illustrative and not restrictive at all points. The scope of the present disclosure is not to be limited by the description given above and is to be recognized as including all changes equivalent to the description of the claims and the scope of the claims.

For example, the chain component of the present disclosure is not limited to the component part of the roller chain, the bushed chain, or the silent chain described above. Further, the present disclosure may be applied also to the component part of an industrial chain for power transmission other than the timing chain.

It is to be noted that, as used herein and in the appended claims, the singular forms "a", "an", and "the" include plural referents unless the context clearly dictates otherwise.

What is claimed is:

1. A chain component of an industrial chain for power transmission, comprising:
    a steel-based substrate; and
    a chromium nitride layer formed on an outer side of the steel-based substrate and containing iron at a content greater than or equal to 1 mass % and lower than or equal to 55 mass %.

2. The chain component according to claim 1, wherein the iron has a concentration distribution decreasing outward from a surface of the steel-based substrate.

3. The chain component according to claim 2, wherein the chromium and the nitrogen in the chromium nitride layer have a concentration distribution decreasing from the outer side toward the surface of the steel-based substrate.

4. The chain component according to claim 1, wherein within entire contents of 100 mass %, iron is contained at a content greater than or equal to 1 mass % and lower than or equal to 55 mass %, chromium is contained at a content of 45 mass % or higher and 90 mass % or lower, and nitrogen is contained at a content of 5 mass % or higher and 25 mass % or lower.

5. The chain component according to claim 1, wherein the iron content is 1 mass % or higher and 45 mass % or lower.

6. The chain component according to claim 2, wherein the iron content is 1 mass % or higher and 45 mass % or lower.

7. The chain component according to claim 4, wherein the iron content is 1 mass % or higher and 45 mass % or lower.

8. The chain component according to claim 1, wherein the chromium nitride layer has a thickness of 2 μm or greater and 30 μm or smaller.

9. A chain constructed such that a pair of outer plates linked together by two pins and a pair of inner plates linked together by two bushes are alternately linked together in a plurality in a state that each pin is loosely fit in each bush, wherein
    at least any one of the pin, the bush, the inner plate, and the outer plate is a chain component according to claim 1.

10. A chain constructed such that a pair of outer plates linked together by two pins and a pair of inner plates linked together by two bushes are alternately linked together in a plurality in a state that each pin is loosely fit in each bush, wherein at least any one of the pin, the bush, the inner plate, and the outer plate is a chain component according to claim 2.

11. A chain constructed such that a pair of outer plates linked together by two pins and a pair of inner plates linked together by two bushes are alternately linked together in a plurality in a state that each pin is loosely fit in each bush, wherein
   at least any one of the pin, the bush, the inner plate, and the outer plate is a chain component according to claim 4.

12. A chain constructed such that a pair of outer plates linked together by two pins and a pair of inner plates linked together by two bushes are alternately linked together in a plurality in a state that each pin is loosely fit in each bush, wherein
   at least any one of the pin, the bush, the inner plate, and the outer plate is a chain component according to claim 5.

13. A chain constructed such that a pair of outer plates linked together by two pins and a pair of inner plates linked together by two bushes onto each of which a roller is fit are alternately linked together in a plurality in a state that each pin is loosely fit in each bush, wherein
   at least any one of the pin, the bush, the inner plate, the outer plate, and the roller is a chain component according to claim 1.

14. A chain constructed such that a pair of outer plates linked together by two pins and a pair of inner plates linked together by two bushes onto each of which a roller is fit are alternately linked together in a plurality in a state that each pin is loosely fit in each bush, wherein
   at least any one of the pin, the bush, the inner plate, the outer plate, and the roller is a chain component according to claim 2.

15. A chain constructed such that a pair of outer plates linked together by two pins and a pair of inner plates linked together by two bushes onto each of which a roller is fit are alternately linked together in a plurality in a state that each pin is loosely fit in each bush, wherein
   at least any one of the pin, the bush, the inner plate, the outer plate, and the roller is a chain component according to claim 4.

16. A chain constructed such that a pair of outer plates linked together by two pins and a pair of inner plates linked together by two bushes onto each of which a roller is fit are alternately linked together in a plurality in a state that each pin is loosely fit in each bush, wherein
   at least any one of the pin, the bush, the inner plate, the outer plate, and the roller is a chain component according to claim 5.

17. A chain constructed such that a plurality of inner plates whose one end part in a shorter-side direction is provided with a pair of linkage teeth formed in a W-shape are linked together in a width direction of the chain by pins in a state that one linkage tooth of one inner plate of adjacent inner plates overlaps with the other linkage teeth of the other inner plate and such that an outer plate is arranged on each outer side of the width direction, wherein
   at least any one of the pin, the inner plate, and the outer plate is a chain component according to claim 1.

18. A chain constructed such that a plurality of inner plates whose one end part in a shorter-side direction is provided with a pair of linkage teeth formed in a W-shape are linked together in a width direction of the chain by pins in a state that one linkage tooth of one inner plate of adjacent inner plates overlaps with the other linkage teeth of the other inner plate and such that an outer plate is arranged on each outer side of the width direction, wherein
   at least any one of the pin, the inner plate, and the outer plate is a chain component according to claim 2.

19. A chain constructed such that a plurality of inner plates whose one end part in a shorter-side direction is provided with a pair of linkage teeth formed in a W-shape are linked together in a width direction of the chain by pins in a state that one linkage tooth of one inner plate of adjacent inner plates overlaps with the other linkage teeth of the other inner plate and such that an outer plate is arranged on each outer side of the width direction, wherein
   at least any one of the pin, the inner plate, and the outer plate is a chain component according to claim 4.

20. A chain constructed such that a plurality of inner plates whose one end part in a shorter-side direction is provided with a pair of linkage teeth formed in a W-shape are linked together in a width direction of the chain by pins in a state that one linkage tooth of one inner plate of adjacent inner plates overlaps with the other linkage teeth of the other inner plate and such that an outer plate is arranged on each outer side of the width direction, wherein
   at least any one of the pin, the inner plate, and the outer plate is a chain component according to claim 5.

* * * * *